United States Patent [19]

Norris et al.

[11] Patent Number: 5,373,555
[45] Date of Patent: Dec. 13, 1994

[54] UNIDIRECTIONAL EAR MICROPHONE AND GASKET

[75] Inventors: Elwood G. Norris, Poway; Charles L. McClendon, San Diego, both of Calif.

[73] Assignee: Jabra Corporation, San Diego, Calif.

[21] Appl. No.: 42,416

[22] Filed: Apr. 2, 1993

Related U.S. Application Data

[63] Continuation-in-part of Ser. No. 881,141, May 11, 1992, abandoned.

[51] Int. Cl.⁵ .................... H04M 1/00; H04R 25/00
[52] U.S. Cl. ............................ 379/430; 381/68.6; 381/155
[58] Field of Search ........... 379/430, 433; 381/68.1, 381/68.3, 68.6, 151, 109, 183, 187, 169, 186, 191, 155

[56]  References Cited

U.S. PATENT DOCUMENTS

| | | | |
|---|---|---|---|
| 3,197,576 | 7/1965 | Martin | 381/169 |
| 3,922,488 | 11/1975 | Gabr . | |
| 3,995,124 | 11/1976 | Gabr . | |
| 4,009,355 | 2/1977 | Poradowski . | |
| 4,051,330 | 9/1977 | Cole | 381/68.1 |
| 4,463,222 | 7/1984 | Poradowski | 379/433 |
| 4,588,867 | 5/1986 | Konomi . | |
| 4,860,342 | 8/1989 | Danner | 379/96 |
| 4,930,156 | 5/1990 | Norris . | |
| 4,972,468 | 11/1990 | Murase et al. | 379/430 |

*Primary Examiner*—James L. Dwyer
*Assistant Examiner*—Jack Chiang
*Attorney, Agent, or Firm*—Thorpe, North & Western

[57] ABSTRACT

An ear piece device configured for being supported in the ear and providing a microphone which primarily detects only sounds originated by the user is contained within a housing which is configured at one end to fit snugly at the ear canal of the user, but not to extend within the ear canal. A microphone element is coupled within the housing in a position such that the microphone element is separated from contact with the skull of the user by the housing. This microphone element is contained within a case which is mechanically and acoustically isolated from vibrations occurring within the housing. A support gasket formed of acoustical absorbing materials is interposed around the microphone case forming a bridge between the housing and the microphone case and contained active element. This gasket includes an outer perimeter in contact with the housing and an inner perimeter which defines two separate circumferential points of contact at the microphone case which are respectively equidistant from and on opposing sides of a plane which includes the active element to provide cancellation of residual vibrations passing to the microphone element from the housing. A speaker element may be included within the ear device and can be decoupled acoustically so as to avoid feedback. This system can operate with full duplex and enable hands free communication and direct voice command by user through computer modems, telephone networks and other communication systems.

25 Claims, 6 Drawing Sheets

UNIDIRECTIONAL EAR MICROPHONE AND GASKET

This is a continuation-in-part of Ser. No. 07/881,141, filed May 11, 1992 now abandoned.

BACKGROUND OF THE INVENTION

1. Field of the Invention

This invention pertains to a microphone/speaker combination which picks up speech vibrations on a unidirectional basis and develops an isolated signal for audio processing which deletes background audio signal. More particularly, the present invention relates to an ear mounted microphone/speaker combination responsive to speech from the user which is substantially isolated from surrounding background noise and which can be used in duplex without occurrence of feedback.

2. Prior Art

The emergence of computer based control systems for virtually every aspect of daily living has re-emphasized the need for an inexpensive system for providing direct voice command capability. At present, most computer systems rely on keyboard input to provide data and processing instructions. This is not only time consuming and limiting in view of physical requirements of being seated with both hands on a key pad, but it limits the efficiency of data input to the typing speed of the user. Indeed, compared with the advanced degree of sophistication of current computer systems, this dominant data entry method of imputing instructions one letter or number at a time seems almost archaic.

This is not to say that the development of voice activated input systems has been ignored. There has clearly been a long recognized need for implementation of a method of voice command which would obviate the keyboard as a computer input device. Numerous problems have remained unsolved, however, and continue to place voice activated systems beyond the financial reach of the general marketplace. For example, the typical level of confidence in voice recognition for commercial software is between 45 to 60%. At this rate, the system is averaging only one out of two words with correct identification. This is hardly adequate for general application. This confidence level is even less when environmental factors are introduced such as background noise, mobility of the user and other unpredictable variables that modify the audio signal being received at the computer.

In typical applications for voice activated systems, one might expect a telephone to ring during dictation, an interruption to occur by another voice having a different voice pattern, the sounding of a horn, clock alarm, or any of thousands of extraneous background noises. Even the shifting of position of the speaking individual can modify the audio signal enough to confuse the computer recognition of sounds. The speaker may simply turn her head to a different direction and create enough variation to thwart voice recognition.

Resolution of these anomalies must be accomplished before voice command systems can be of general use. Current efforts have focused on generation of complex algorithms which sift through the maze of audio signal and attempt to classify and discard background noise. Obviously, it is impossible to completely predict and program every potential superfluous signal that may eventually be detected. Voice variations by the user are even more challenging, because the occurrence of a cold, sinus problems, and variations in voice orientation to the microphone are extremely difficult to classify or quantify. As a consequence, voice command systems are marginal in overall performance and are extremely expensive.

Undoubtedly, part of the problem of voice recognition arises because of the use of conventional microphones as the media for processing voice signals. Voice recognition obviously requires conversion of the audio input to digital or analog signal. Generally, a digital conversion is necessary before comparison with database information is possible. A normal microphone will pick up sounds indiscriminately, thereby adding in background noise which is a primary source of confusion.

Although some discrimination of sound can be accomplished by frequency filters, proximity attenuators, and related devices that group sound characteristics as to common features of frequency or volume, total isolation of desired sounds has not generally been accomplished when the speaker is in a nonisolated environment. Although some applications of unidirectional microphones have provided improved isolation, development of such a totally selective microphone system has long been needed and would provide great advantage in countless applications. This is so with any form of telephone system that is hands free so that the microphone is picking up background signal along with the primary speaker's voice. Visor microphones for cellular car phones are just one of a myriad of examples. TV and stage cameramen, as well as other sound technicians who must communicate quietly while recording or producing video and sound works, require constant communication which functions best in an isolated mode. Switchboard operators, pilots, motorcyclists, workers having on-line communication systems in high-noise environments—all need a communication system which isolates the voice signal from all extraneous sounds.

U.S. Pat. No. 4,588,867 by Konomi addressed some of these problems and disclosed the possible utility of an ear-mounted microphone for discarding air-borne sound waves in favor of bone conduction of the speaker's voice. Aside from technical problems which may have affected the inability of this device to perform adequately, practical considerations also limit the general acceptance of such ear-mounted microphone systems. For example, the Konomi device places a microphone element deep in the ear canal in order for vibrations to be accessed from the bone. This requirement immediately imposes the high cost of having the canal insert portion sized to the unique configuration of the user's ear canal as with a hearing aid. It also adds the discomfort of having an insert in the ear, creating an unnatural and unacceptable sensation which would undoubtedly preclude universal usage of the device.

As a further problem, the Konomi reference may be subject to audio feedback arising from the close proximity of the microphone element and speaker, where a duplex mode is selected. Konomi attempts to reduce such feedback by insertion of sound absorbing barriers between the microphone and speaker portions of the device. Because a total barrier is virtually impossible to develop, there is always some sound which penetrates, generating some feedback signal. Needless to say, the challenge of an acceptable ear-mounted microphone was not resolved with Konomi.

U.S. Pat. No. 4,930,156 by Norris addressed the problem of audio feedback with its disclosure of an ear microphone/speaker combination; however, the microphone was placed outside the ear and was sensitive to ambient noise. The absence of isolation of the speaker voice gave the device only limited acceptance, despite the fact that it offered some improvement over the prior art.

U.S. Pat. No. 4,009,355 by Poradowski, and U.S. Pat. Nos. 3,995,124 and 3,922,488 by Gabr represent a line of directional microphones which are generally referred to as unidirectional systems. These microphones typically provide for opposing openings in opposite ends of the microphone casing. This permits sound waves to enter the casing from different orientations with respect to an enclosed speaker element. If the origin of the sound waves is at a substantial distance from the microphone, the arrival of each sound wave at each of the opposing openings is substantially concurrent. Because this sets up two opposing acoustic waves within the speaker casing, the waves cancel and the sound is basically undetected or unregistered at the speaker element.

This technique has been used to reduce ambient noise and provide some speech isolation for phone operators, camera staff, and other isolation communication systems as designated above. Typically, this unidirectional microphone is positioned within a boom or forward extending support arm that places the microphone immediately in front of the speaker's mouth. It's close proximity to the mouth provides a differential response of sound waves at the opposing openings, based on the time difference in arrival of the wave at each opening. As a consequence, the proximate sound waves do not cancel, giving some selectivity to the near speech, as opposed to sound generated at a sufficient distance that the acoustic waves arrive at the respective openings in the speaker casement at the same time.

Nevertheless, there remains a dissatisfaction with the inconvenience of a boom suspended in front of the speaker's face. It imposes an obstacle that interferes with movement of food or drink toward the user's face, as well as providing a limiting factor to movement which might jostle the microphone from its proper position. Cosmetically, it is obviously unpopular. However, because prior art attempts to place the microphone away from the face and toward the ear give rise to feedback problems with the associated speaker positioned at the user's ear, the boom remains the primary means of isolating speech in a microphone system.

Unidirectional microphone systems have been limited to isolated microphone applications because the combination of a microphone with a speaker element has typically resulted in feedback. Control of feedback in a duplex mode for a mic/speaker combination has been the subject of continued research for many years. Although it has been generally recognized that the ear is an ideal support location for a duplex mic/speaker, overcoming technical problems such as feed back and sound isolation has presented a formidable challenge.

What is needed therefore is a microphone that more effectively isolates the voice of the speaker from the environment, yet permits use with a speaker in the same housing without feedback. Such a device should permit use at the ear without insertion of physical structure within the ear canal, with attendant fitting expense and discomfort.

OBJECTS AND SUMMARY OF THE INVENTION

It is an object of the present invention to provide an ear-mounted microphone which is capable of isolating the voice of the speaker from all extraneous, background noise.

It is a further object of the present invention to provide an ear mounted microphone which does not require entry of any physical structure within the ear canal yet still isolates the voice of the speaker from all outside noises.

Yet another object of the present invention is to provide for an ear mounted microphone which includes a speaker in direct proximity with the microphone for enabling duplex operation in a speak and listen mode.

A still further object of the present invention is to provide a microphone/speaker device which is mounted at the ear and which enables hands free, duplex communication without feedback.

Another object of the present invention is to provide an ear mounted microphone capable of providing audio input to a computer or modem to facilitate voice recognition for direct voice command to computer controls.

Another object of the present invention is to provide a microphone/speaker combination which can be interconnected with a telephone system to provide hands free speak and listen capabilities in duplex mode.

Yet another object of this invention is to enable voice pickup via an ear mounted microphone which can be coupled into a telemetry unit for wireless communication with a modem, computer or other receiver device capable of accepting radio frequency signal.

These an other objects are realized in an ear piece device for use in a communication system which includes a housing having a speaker end and a microphone end, said speaker end being configured for a snug fit at the ear canal of a user without including structure which enters the ear canal during operation. The speaker end and microphone end are separated by an acoustically insulating wall which encloses the microphone end to form a microphone compartment. Acoustical isolation means is coupled between the speaker element and the housing for selectively isolating undesirable frequencies that might interfere with sensitivity of audio pick up at the microphone end of the housing. A microphone element is mounted at the microphone end of the housing in a position such that the microphone element is substantially enclosed within the compartment and is separated from contact with the skull by the housing. This microphone compartment includes means for canceling acoustical waves at the microphone element which are mechanically transferred from the housing. Means are provided for coupling signal output from the microphone element to an audio circuit for processing.

The present invention includes a method isolating an individual speech for reproduction from the environment or background noise associated with the individual wherein the method comprises the steps of:

positioning a housing device with contained speaker element and microphone element at an ear canal supported by the user's ear cartilage;

mechanically and acoustically isolating the speaker element from the housing to limit the amount of sound vibration which is carried into the housing;

mechanically and acoustically isolating the microphone element from the housing to limit the amount of sound vibration which is carried into the microphone element; and concurrently channelling vibrations from the housing into a casement for the microphone element such that the vibrations reach the microphone element along the casement at approximately the same time but in opposing phase relationship to result in wave cancellation.

Other objects and features of the present invention will be apparent to those skilled in the art, taken in combination with the accompanying drawings.

DETAILED DESCRIPTION OF THE INVENTION

Referring now to the drawings

The figures illustrate two embodiments of a microphone and speaker device that is positioned at the ear and is supported by the cartilage at the ear canal. The microphone element in each instance is designed for localized sensitivity to pickup speech of the wearer, while disregarding more distant sounds associated with background noise. Both embodiments provide a design which substantially neutralizes feedback by acoustically isolating the microphone element from vibrations carried within the casing, as well as canceling background noise that interferes with detection and transmission of the wearer's voice signal.

A significant common feature of both devices is the technique for preventing pickup by the microphone of vibrational signal carried within the casing or housing of the speaker and microphone. Such vibration received at the microphone element typically generates feedback, which has been the primary hurdle in developing an ear-supported, duplex device. The present invention utilizes a specially designed support gasket which absorbs most of the energy before it reaches the microphone, in combination with a unique mounting configuration for the microphone within the gasket for canceling out the remaining signal at the active element or diaphragm of the microphone. The features are illustrate in a vertical configuration in FIG. 1 and a horizontal configuration in FIG. 3.

Figure 1:
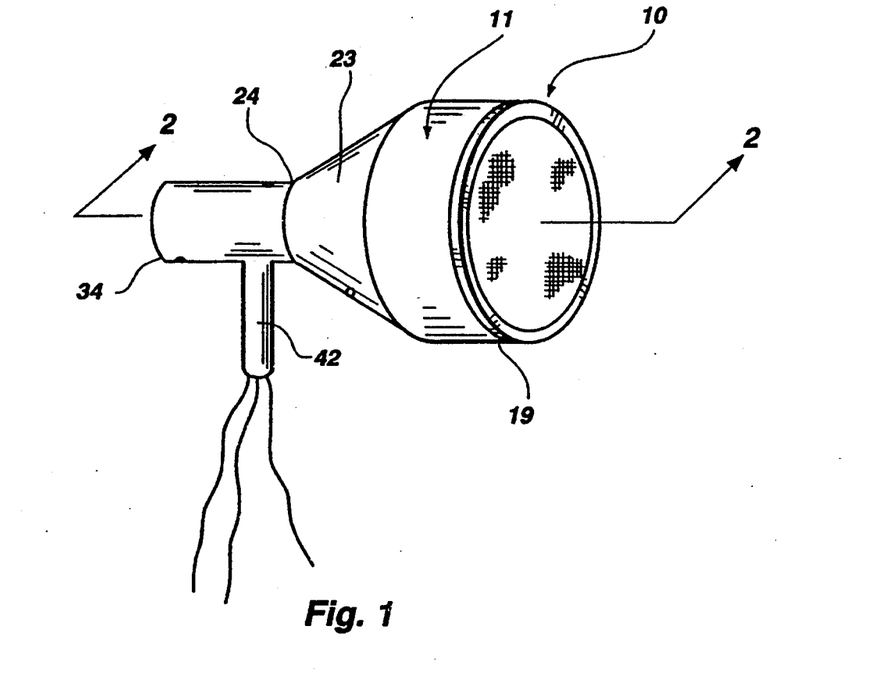
FIG. 1 shows a perspective, elevational view of one embodiment of an ear device including a speaker element and microphone element.

Turning to the embodiment of FIG. 1, the ear piece 10 of the present invention includes a surrounding housing 11 which forms a cavity 12 capable of housing a speaker element 13 with its directional orientation 14 positioned toward the ear canal 15 (FIG. 14) when positioned at the user's ear 16. A microphone element 17 contained within the housing 11 primarily detects sound vibrations generated by the user.

The housing 11 is configured at one end 19 to fit snugly at the ear canal 15 by frictional contact with surrounding ear tissue 20 and 21. It is significant that the housing and its attached structure does not extend into the ear canal 15 and therefore does not impose any discomfort or unique fitting requirements for use of this device. The housing may be constructed of any suitable material such as ABS plastics, and preferably of materials which minimize vibrational transfer between the speaker 13 and microphone 17.

Figure 2:
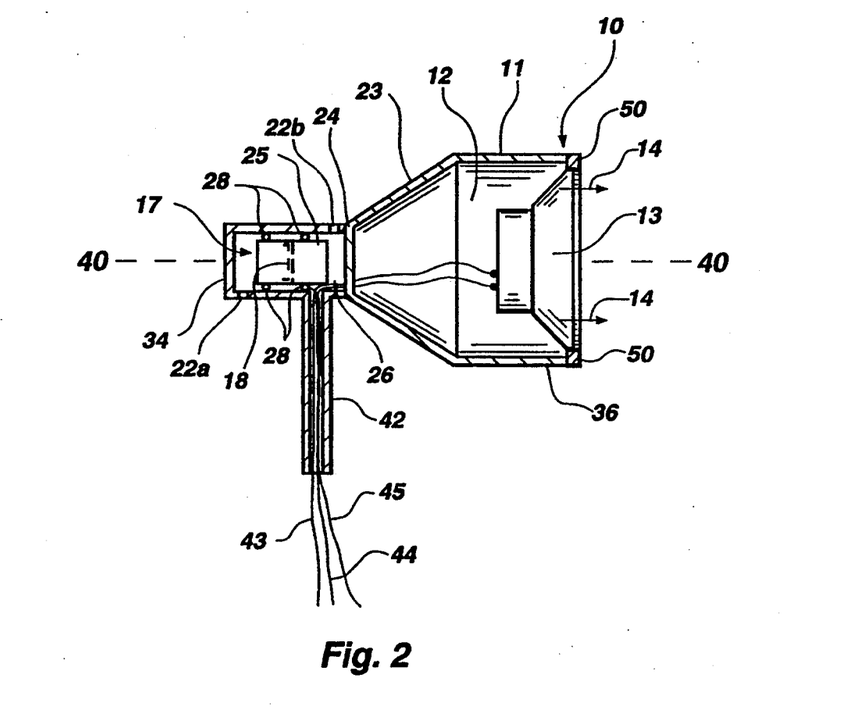
FIG. 2 discloses a cross section of the housing of the device shown in FIG. 1, taken along the lines 2—2.

The microphone 17 may be any conventional type such as a carbon, electret, piezo crystal, etc. The embodiment illustrated in FIG. 2 is an electret microphone having an aluminized mylar diaphragm and plate 18 positioned with a microphone casement 25. This casement 25 is inserted within the microphone end housing 34 with a unique gasket configuration represented by acoustical mounting rings 28 which mechanically and acoustically isolate vibrations from the housing. Those vibrations which are not absorbed by the gasket and therefore pass through the mounting rings are carried into the microphone casing 25 at approximate equal entry distances from the microphone element 18. Because of this approximate equal distance from each mounting ring 28 to the centrally disposed microphone element 18, vibrations from the housing arrive at the microphone element at approximately the same time, but in opposite phase relationship. Accordingly, the opposing vibrational waves cancel, registering no wave energy or vibration. Accordingly, the microphone element is both mechanically and acoustically isolated by reason of the sound insulation and sound cancellation provided by the interconnecting structure at the microphone casing 25. The exact separation distance can be physically tuned by adjusting the mounting rings along the casing until the maximum cancellation effect is achieved.

Figure 3:
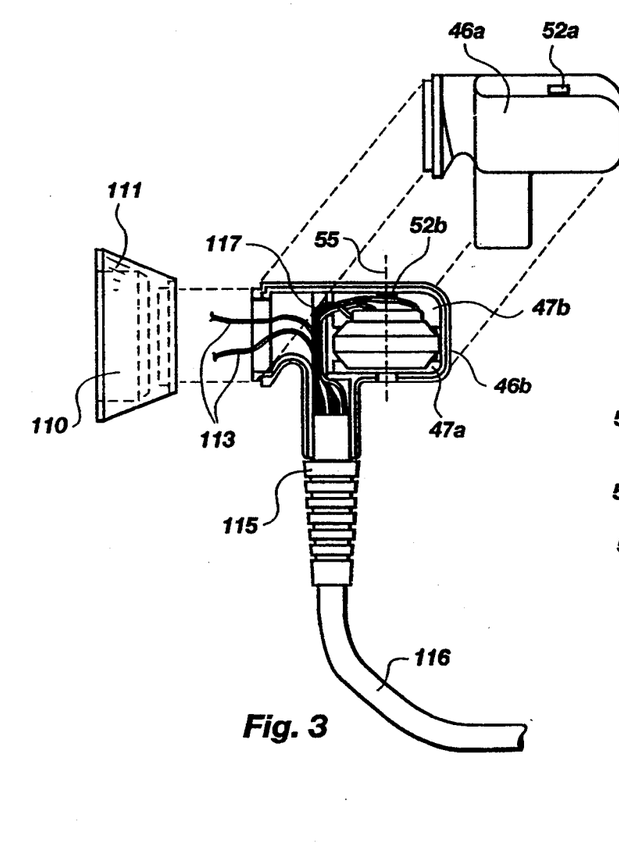
FIG. 3 depicts a second embodiment in partially exploded form illustrating a horizontal configuration for the microphone element of the device.

Background sound vibrations are canceled by use of at least two opposing openings 22a and 22b which communicate through the housing and casing with the surrounding environment. With respect to sound waves travelling from substantial distances, as compared with the distance of the ear piece from the user's mouth, such waves arrive at the respective openings 22a and 22b at the same time. Acoustical waves are concurrently formed at each opening, and propagate toward the microphone element until they cancel. Accordingly, distant sound transmissions are effectively canceled by super positioning of opposing waves entering through the respective opening 22a and 22b. It will be apparent that multiple openings can be applied in place of a single opening on each side of the microphone element as illustrated in FIG. 3, with similar sound cancellation.

It will be noted that a second housing portion 42 is provided and operates as a conduit for exiting wire 43, 44 and 45. Wire 43 represents the exterior portion which extends from the microphone element. Wires 44 and 45 are contacts which couple with the speaker element 13.

To enable duplex operation of both speaker and microphone in the same housing, it is necessary to acoustically isolate the speaker element 13 from the casing. In the present invention, this is accomplished by tuning the insulation means 50 similar to operation of a band pass filter within radio circuitry. Specifically, the speaker element 13 is mounted to the end housing 36 through a nonvibrational ring 50 which extends around the speaker element and operates to isolate the housing as sound insulation means from the speaker element. This further helps to prevent sound vibration transmission through the housing and into the microphone element, which might otherwise lead to irritating feedback. It has been discovered that Kreton (tm), a soft polymer which can be injection molded to desired gasket shapes, has surprising capabilities to absorb sound. It is presently the preferred composition for the sound absorbing material used in the present embodiments.

This problem becomes significant in duplex operation because of the close proximity of the speaker element 13 and microphone element 17. In such close proximity, vibration associated with the speaker element would normally be transferred into the housing and immediately fed into the microphone element 17. In a duplex telephone system where side tone is present, signal from the microphone element 17 is fed back into the speaker 13 to facilitate the user hearing his own voice as reproduced. Failure to acoustically isolate the speaker results in vibrational energy transferred into the housing which represents the speaker's voice being recirculated in a loop. This results in the common occurrence referred to as feedback.

This insulating ring 50 is comprised of materials such as Kreton which are specifically selected or tuned to a particular frequency range that is substantially below the frequencies that will be passed on to the speaker, thereby isolating the speaker acoustically. Other suitable materials may also be applied to tune the insulation ring 50 to a particular frequency range including silicone. Selection of specific material will depend on the frequency range being detected, being tuned to the specific frequency to absorb its vibrational energy and block its passage from entering the housing 11. Such material can also be applied at the rearward portion 24 of the housing 11 where the respective fine speaker wires 44 and 45 pass through the housing and out the conduit 42. With both the speaker and the attached wiring insulated, the speaker vibrations are isolated and duplex operation is facilitated without feedback.

FIG. 3 illustrates the second embodiment of the present invention wherein the microphone is positioned within a housing 46 which includes the microphone compartment 47a and 47b. The active microphone element 48 is suspended in a rigid case 49 which is positioned within a support gasket 51. This support gasket performs a function similar to the rings 28 discussed in connection with FIG. 2. In this instance, however, the gasket is a single, injection molded component that performs the desired noise cancellation similar to the cancellation of the rings 28. This is discussed in greater detail hereafter.

The microphone compartment includes at least two openings 52 and 53 in the housing forming sound transmission ports operable to pass ambient sound waves to the microphone element. This "unidirectional" technology has been discussed above. The present embodiment includes at least three openings 52a, 52b and 53 forming sound transmission ports operable to pass ambient sound waves to the microphone element 48. At least two of these openings 52a and 52b are positioned within the top side of the housing above an intermediate plane 54 which is defined by the active element 48. The remaining opening 53 is positioned within the housing at an opposite side of the intermediate plane for enabling cancellation of acoustical waves representing distant background sound as has been previously discussed.

Figure 6:
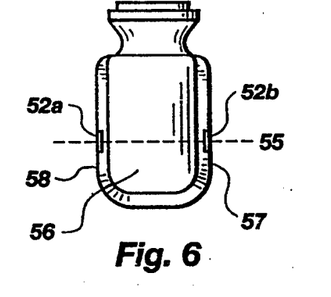
FIG. 6 is a top plan view of the assembled device of FIG. 3.
Figure 7:
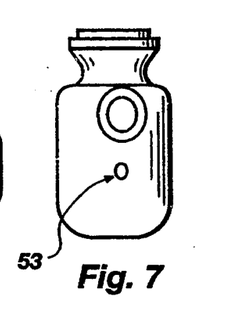
FIG. 7 is a bottom plan view of the same device.
Figure 8:
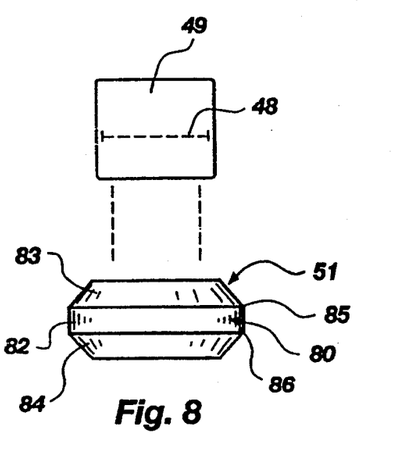
FIG. 8 graphically illustrates a sound absorbing gasket with microphone component.
Figure 9:
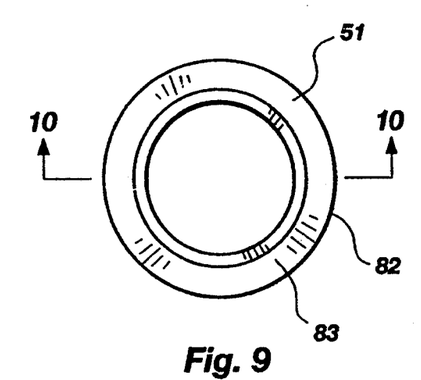
FIG. 9 shows the gasket of FIG. 8 as a top view.
Figure 10:
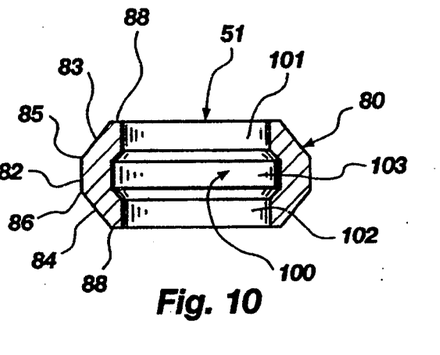
FIG. 10 is a cross-section of the gasket of FIG. 8, taken along the lines 10—10.

The illustrated embodiment positions the three openings 52a, 52b and 53 within a common plane 55. This favors propagation of a common wave front from both sides of the active element to enhance cancellation of the undesirable background noise. Ideally this common plane includes a central axis of the microphone element so that the strongest aspect of the propagated wave front from both sides of the intermediate plane arrives at a center portion of the active microphone element 48. Similarly, it is preferred that the two of the openings 52a and 52b at the top of the housing are positioned at opposing sides and at a common vertical height with respect to the microphone element. This configuration of divided openings appears to further enhance formation of a wavefront which enable more complete cancellation of background sound waves. This split configuration of openings also enables reduces overhead space above the microphone case, as well as providing improved aesthetic appearance to the housing by providing a smooth, continuous top surface 56 (FIG. 6).

In order to maintain common amplitude for background noise propagated through the respective openings 52a, 52b and 53, it is preferred to have the total opening size of all openings on one side of the intermediate plane equal to the total opening size of all openings on the opposite side of the intermediate plane. Accordingly, the surface area of the circular opening 53 is approximately equal to the surface area of the two rectangular openings 52a and 52b.

It is possible that changes in geometric shape of the housing will affect the choice of opening configurations as well as quantity. With respect to the present housing and microphone compartment which is configured substantially as a rectangular box, the illustrated arrangement of openings offer surprising improvement over use of opposing single openings as disclosed in FIG. 2. In the embodiment of FIG. 3, the top side of the box has opposing long edges which are formed as curved or angled side walls connecting the top wall 56 to opposing vertical side walls 57 and 58. It has been discovered that positioning the two openings 52a and 52b in each of the opposing angled side walls enhances the clarity of the desired signal, presumably by canceling the background signal more effectively.

In addition to filtering out the background signal by utilizing unidirection microphone techniques implemented by the multiple openings 52a, 52b and 53, effective avoidance of feedback in the present invention requires isolation of the microphone element from mechanical vibrations developed in the housing. This was accomplished in the FIG. 1 embodiment with the support rings 28. The embodiment of FIG. 3 is an improved configuration which utilizes a support gasket positioned around and forming a bridge between the housing and the microphone case and contained active element 48.

The support gasket 51 provides a unique configuration and composition which function to absorb or dissipate sound vibrations received from the housing, and then cancel remaining vibrations that are transmitted to the microphone element 48. This configuration includes an outer perimeter 80 configured for intimate contact with the housing inner surface 81. This contact needs to be sufficient to obtain a uniform transmission of housing vibration into the gasket such that wave cancellation occurs at the active element 48.

In the illustrated embodiment, the outer perimeter 80 of the gasket and inner surface 81 of the housing are noncylindrical configurations which seat against each other to secure a fixed position for the gasket within the microphone compartment without need for adhesive material. Avoidance of adhesive between the gasket and housing is important because the adhesive may become rigid or brittle and may not be effective in reducing or absorbing vibrational energy. The use of a noncylindrical configuration for securing the gasket within the housing operates in a tongue-in-groove manner, enabling firm compression of the gasket between opposing sides 46a and 46b of the housing.

The illustrated configuration of contacting surfaces between the housing can be viewed as generally concave and the outer perimeter of the gasket has a generally convex, enabling the gasket to nest in the concave configuration of the housing. The specific noncylindrical contact configuration comprises a central portion 82 which is cylindrical but which is joined to upper 83 and lower 84 portions. These portions of the perimeter form inverted conical configurations which respectively have larger diameters at one edge which form a juncture with top 85 and bottom 86 edges of the cylindrical central portion and smaller diameters at a remaining edge 87 and 88 which extend away from the plane of the cylindrical central portion. Similarly, the inner surface of the housing has the same configuration in mirror image with cylindrical surface 105 and conical surfaces 106 and 107 to form the respective concave and convex contacting surfaces 81 and 80.

Figure 4:
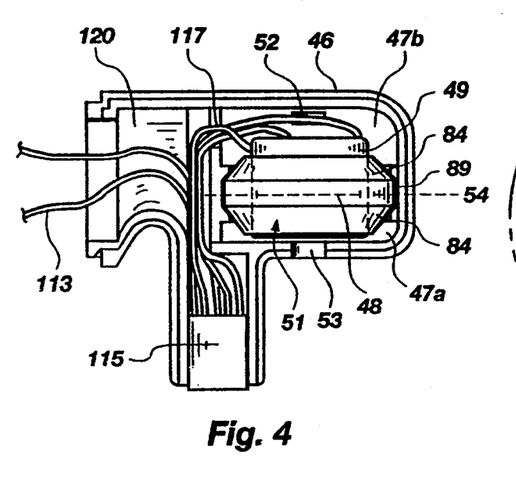
FIG. 4 represents an enlarged view of the internal configuration of the microphone compartment.
Figure 5:
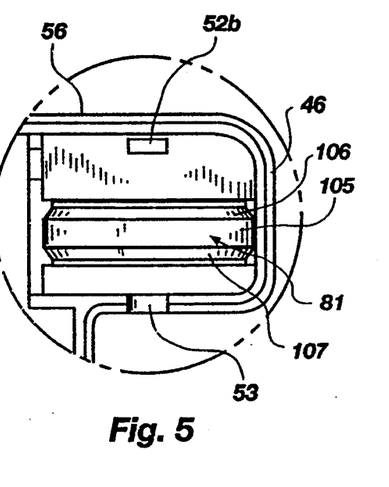
FIG. 5 illustrates the internal configuration of the microphone compartment housing.

These contacting surfaces are illustrated in FIGS. 3 and 4 in seated position. It will be noted that a small annular cavity or gap 89 is centrally disposed around the outer perimeter of the gasket and between the gasket and the housing to form an insulative cavity ring which divides contact of the gasket with the housing to upper 83 and lower 84 sections. It appears that there may be some advantage to propagate the sound waves through the upper 83 and lower 84 surfaces of the gasket, rather than through the central portion 82. This is not to say that other configurations for the contacting surfaces of the housing and the gasket may not work satisfactorily in accordance with the inventive teachings provided herein.

A key aspect of these inventive teachings includes the provision of an inner perimeter 100 of the gasket which defines two separate circumferential points of contact 101 and 102 at the microphone case. As with the rings 28, these contact surfaces 101 and 102 are respectively equidistant from and on opposing sides of a plane which includes the active element 48. These surfaces provide transmissive contact of surviving vibrations into the microphone case, where they are then conducted to the active element 48. As a result of the equidistant spacing of these surfaces from the active element, wavefronts arrive concurrently and cancel because they are in opposite phase.

This occurs because the inner perimeter of the gasket includes an annular cavity 103 centrally disposed around the inner perimeter of the gasket and between the gasket and the microphone case. This forms an insulative cavity ring which divides contact of the gasket with the case to upper and lower sections which are respectively equidistant from the plane which includes the active microphone element. Although the upper and lower sections of the inner perimeter of the gasket are shown respectfully in circumferentially, continuous contact around the microphone case, it is possible to have discontinuous contact points around the periphery and accomplish some cancellation at the active element. Accordingly other configurations of microphone/gasket interface are envisioned, including a configuration wherein the respective contacting surfaces 80 and 81 are in full contact.

Because the device shown in FIGS. 1 and 3 is capable of dissipating and canceling unwanted sound vibrations arriving from the housing, it is capable of operating with an inserted speaker as part of the device. Accordingly, a speaker cavity 110 is provided with the speaker end 111 of the device. The speaker end is configured to mount at the housing end 112 opposite the microphone compartment 47. Speaker leads 113 are provided to connect the speaker to circuitry which processes the signals to and from the device. These leads exit the housing through a collar 115 and cable shield 116. Similarly, the microphone is connected with the processing circuitry by leads 117. A barrier wall 120 separates the respective microphone 47 and speaker compartments.

The housing is capable of being injection molded in two parts as shown in FIG. 3. The gasket 51, microphone and connecting wires are laid in place with the gasket seated in the receiving channel 81 and the two halves are then glued together with the speaker end 111. The microphone element is automatically positioned in proper relationship within the microphone compartment by reason of the configuration of the receiving channel 81. The microphone compartment is divided into two portions of approximately equal volume 47a and 47b. This factor helps to balance the cancellation effect that occurs at the microphone element 48.

Figure 12:
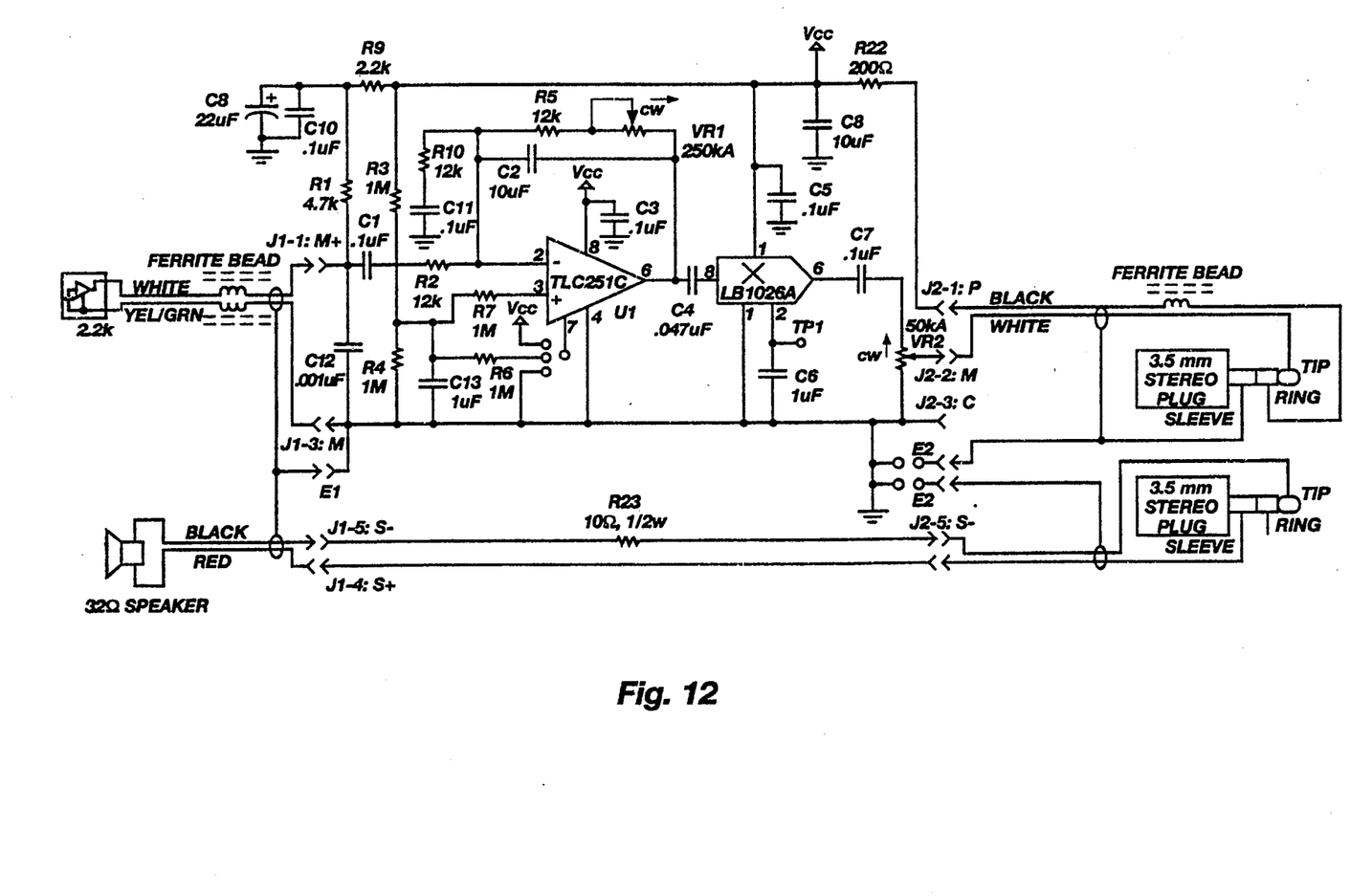
FIG. 12 discloses a circuit diagram for use with the subject invention as part of a telephone system that is positioned at the user's ear.

FIG. 12 discloses a sample circuit that is effective for processing the microphone and speaker signals as part of a telephone ear piece which is capable of duplex operation. It will be apparent to those skilled in the art that other circuits could be applied with respect to the microphone along, or the combined speaker and microphone combination.

Figure 13:
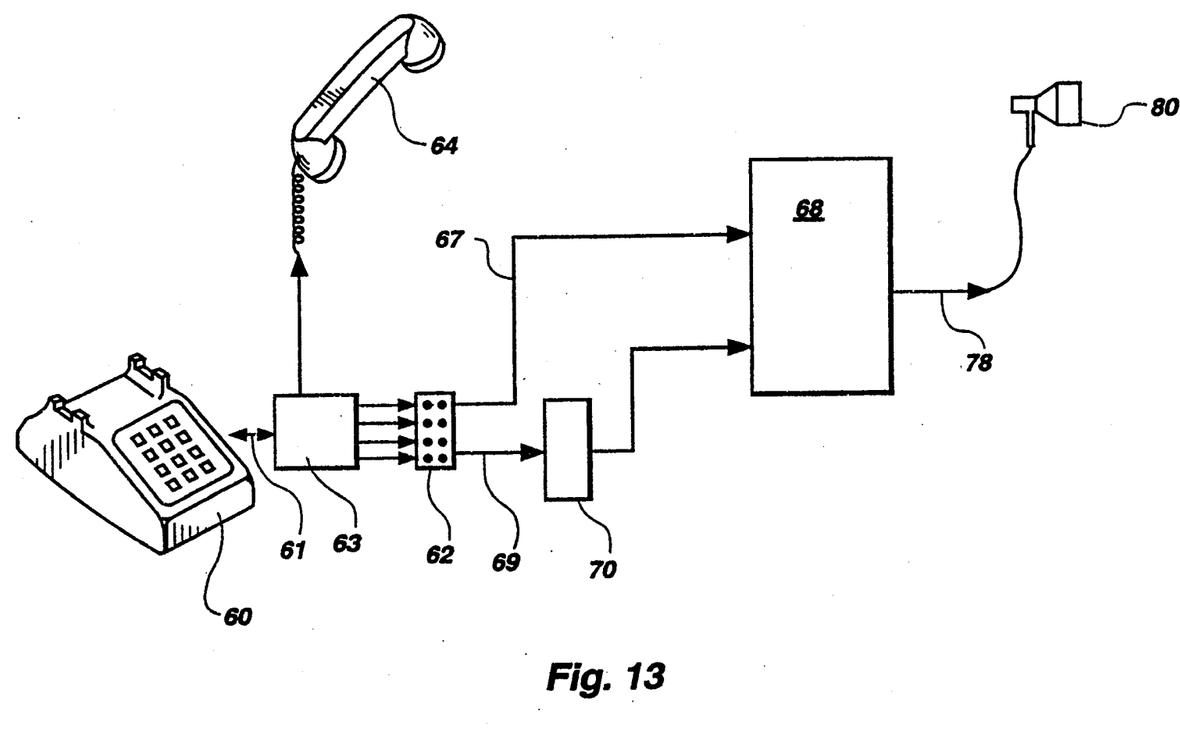
FIG. 13 shows a schematic layout of the ear piece device in combination with a telephone circuit.

FIG. 13 illustrates a basic telephone unit and casement 60 which are coupled into a telephone standard jack for connection to a communication network. The present ear piece device as shown at item 80 provides a microphone and speaker signal which will be processed and transmitted through conventional wirings 61 coupled to the telephone unit 60. Universal coupling configurations to adapt the present system to a standard, four lead telephone wire are disclosed in U.S. Pat. No. 4,930,156 and represented in FIG. 13. Additional explanation of this system may be obtained by reference to this U.S. patent.

Figure 14:
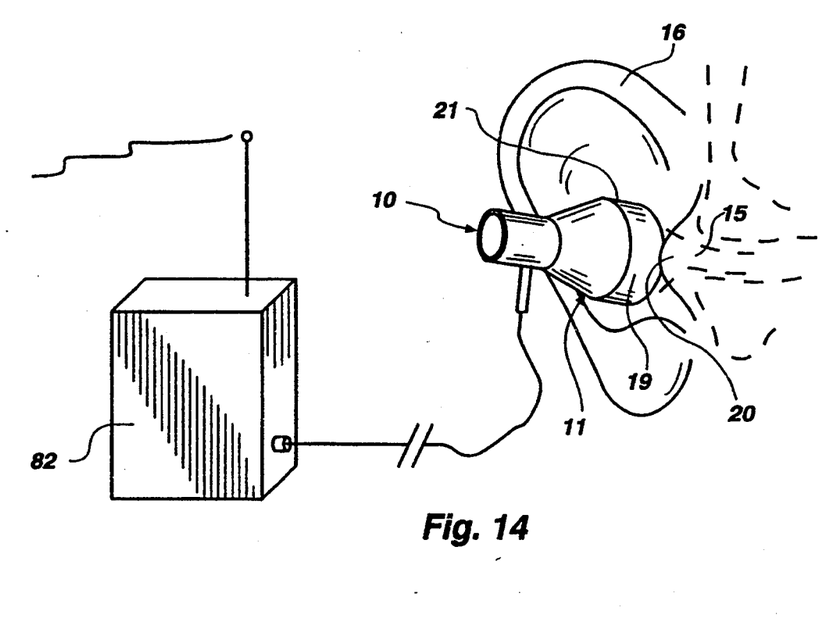
FIG. 14 illustrates the use of the present ear piece device with a telemetry system, enabling isolated voice communication.

The present invention can be coupled into this standard phone system by use of a mode switching device 63. This is accomplished by a toggle switch wherein one position transfers the signal directly to the handset 64 as if the control circuitry and ear piece of the present invention were not attached. When switched to a secondary position, the signal is transferred into an interconnect jack 62 which operates as described in the referenced U.S. patent. One output line 67 carries speaker signal and feeds to the primary control circuitry 68 which includes speaker amplifier, mike preamplifier and phasing control. The second output line 69 carries microphone signals through a diode bridge 70 and into the primary control circuitry 68. Both microphone and speaker signals are transmitted along a four wire connection 78 to the ear mounted speaker/microphone combination 80 as disclosed in this invention and represented in FIGS. 1 and 3. It will also be apparent that the interconnect lead 78 could be serviced by a radio frequency transmitter/receiver which could provide a wireless mode to this duplex telephone system. Similarly, the present system can be wired to a belt transmitter 82 as shown in FIG. 14. In this system, the ear device with either a microphone or microphone/speaker combination can be wired from the ear to the belt transmitter 82 to facilitate convenient operation without the extra weight of a transmitter unit positioned within the housing 11.

The embodiment represented in FIG. 14 is particularly useful with respect to transmission of voice commands to computer systems which are capable of voice recognition. This arises because of the isolated content of the voice reproduction. In a microphone mode, the present device receives sound waves from the user's voice. On the other hand, distant sound waves such are received into the microphone but cancel out as previously explained. Similarly, the rotation of the user's head has no impact upon the quality of voice transmission because relative distance remains the same between the ear and mouth.

In view of this method of isolating the voice of the speaker from the environment, the present ear mounted microphone enables greatly simplified algorithms for implementing voice recognition. In essence, the voice of the speaker is generally the same and can be used to train the algorithm and computer to reproduce corresponding commands associated with the acoustic vibration sent into the housing 11.

When the present invention was substituted within a conventional voice recognition system which previously yielded confidence levels of 45 to 60 percent, voice recognition was improved to the average of 80 to 90 percent. This remarkable improvement based on use of the present microphone element as disclosed and claimed in this application opens the door to a new era of voice command for computer systems generally.

Figure 15:
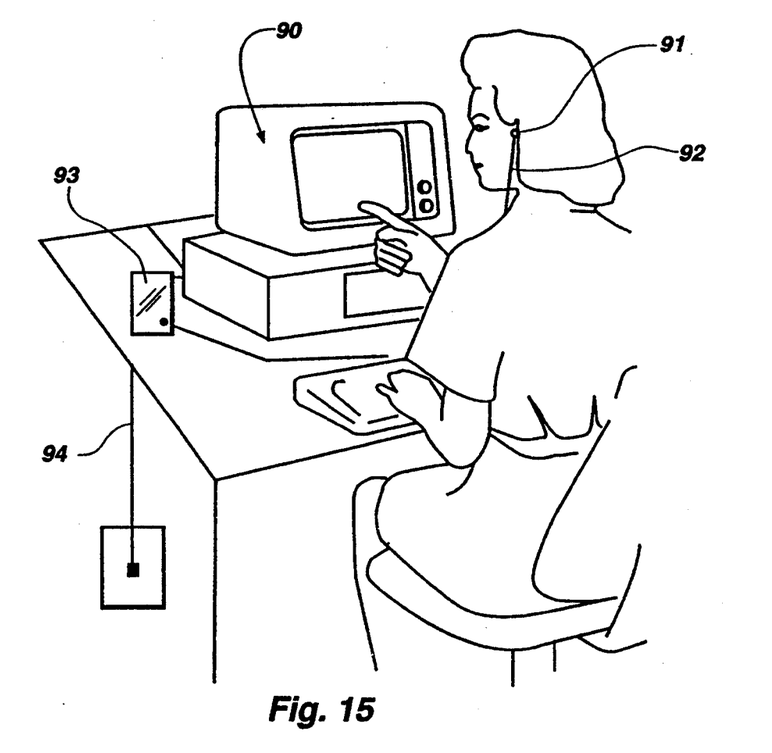
FIG. 15 graphically illustrates the use of the present ear piece device in combination with a computer and modem, enabling voice recognition and voice command.

For example, FIG. 15 illustrates the use of voice command with a computer 90 which includes software capable of voice recognition. Voice commands are supplied through the ear microphone 91 of the present invention, which is wired 92 into a control circuit 93 which amplifies and supplies appropriate signal into a computer modem (not shown) at the back of the computer. Voice command is now enabled and the user may directly state the desired action verbally, to which the computer can immediately respond. Additional voice communication is enabled by the user through a coupled phone line 94 which enables concurrent voice communication with third parties.

Based on this system, the user may discuss in conference call various issues arising with respect to preparation of documents or other matters facilitated by computation of a computer system and may immediately give voice command to the computer to implement and perform desired operations. This is all accomplished in "hands-free mode" without concern for environmental noises associated with the operator's station. The system can even be made mobile for intercommunications while the operator moves about an office building where the office building has been configured with a microcell communication system. In this instance, the telemetry system as shown in FIG. 14 would be used by the operator, who would move from section to section, communicating directly with common frequencies which tie the various microcells into a single network of communication. In this case, the operator can give verbal commands to computer to take care of certain operations, may communicate directly with other individuals within the microcell and can generally perform multiple duties by mere voice command. In addition, the user can direct a computer to place a phone call to a third party outside the microcell and can establish direct phone line communication with this party via the duplex mode within the ear piece 10. Such a system gives total flexibility to the operator who may be mobile and operating with hands free to accomplish multiple tasks and communicate with multiple parties.

These various benefits and improvements are provided in a method for isolating desired air born vibrations to be detected by a small microphone from background vibrations within a housing which contains the small microphone, wherein the method comprises the steps of:

a) positioning a microphone case and contained microphone element within a microphone compartment formed within the housing b) forming at least two openings in the housing as sound transmission ports operable to pass ambient sound waves to the microphone element in accordance with the configuration shown in FIG. 3;

c) positioning the microphone case and active element within a support gasket which forms a bridge between the housing and the microphone case and contained active element, wherein the gasket has an outer perimeter in contact with the housing and an inner perimeter which defines two separate circumferential points of contact at the microphone case which are respectively equidistant from and on opposing sides of a plane which includes the active element; and d) coupling signal output from the microphone element to an audio circuit for processing.

Figure 11:
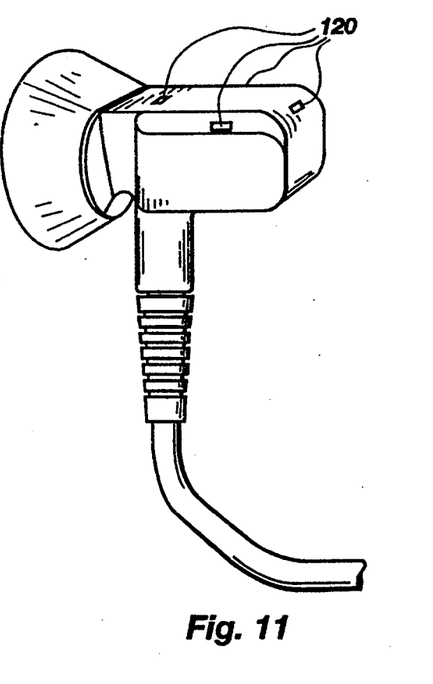
FIG. 11 is a perspective view of the device of FIG. 3.

Although preferred embodiments and specific examples have been disclosed, it is to be understood that numerous variations from the illustrated examples may be developed. For example, an embodiment such as shown in FIG. 11 could be prepared using three or four holes 120 in the top 121 to increase the directional sensitivity of the microphone. Obviously, the two openings of FIG. 3 have primary directional sensitivity along a line connecting the respective openings. By increasing the openings around the top or bottom of the housing and microphone compartment, greater directional sensitivity will develop.

Accordingly, it will be understood by those skilled in the art that the scope of the invention is to be determined only by the following claims and not by specific examples recited herein.

I claim:

1. An ear piece device configured for being supported at an ear and providing a microphone element which detects only sounds generated within the immediate vicinity of the skull of a user, said ear piece including:
   a housing which is configured at one end for positioning at the ear canal of the user, said housing including an interior surface defining a microphone compartment;
   a microphone positioned within the microphone compartment and comprising a rigid case having an exterior surface and an active microphone element contained within the rigid case;
   said microphone compartment including at least two openings in the housing forming sound transmission ports operable to pass ambient sound waves to the microphone element, said openings being respectively positioned at opposite sides of the microphone element for enabling cancellation of acoustical waves representing distant background sound which enters the compartment through air transmission from a substantial distance as compared to the near location of the user's skull;
   a support gasket relatively adjustable with respect to and positioned around the rigid case which contains the active microphone element so as to form a bridge between said rigid case and the housing, said gasket having an outer perimeter in contact with the interior surface of the housing and an inner perimeter which defines two separate circumferential points of contact at the rigid case such that said support gasket is contactably sandwiched between the interior surface of the housing and the exterior surface of the rigid case at the two circumferential points of contact, wherein said two circumferential points of contact are respectively common to first and second substantially parallel planes passing through the rigid case and being substantially equidistant from and on opposing sides of a plane which includes the active microphone element, to thereby cause mechanical waves in the housing to pass from the housing through the support gasket and into the rigid case at the two opposing circumferential points of contact such that said mechanical waves arrive at the active microphone element at substantially the same time and in opposing phase relationship to cause substantially all of said mechanical waves to cancel each other; and
   means for coupling signal output from the microphone element to an audio circuit for processing.

2. A device as defined in claim 1, wherein the microphone element and compartment are positioned at one end portion of the housing, and the opposite end portion of the housing is configured to fit snugly at the ear canal.

3. A device as defined in claim 1, wherein the housing includes an elongate axis which is oriented along the portion of the housing which is supported at the ear canal, said axis being directionally oriented toward the ear canal when the housing is in position for use and extending through the microphone compartment.

4. A device as defined in claim 1, wherein the support gasket is formed of a Kreton (tm) polymer composition.

5. A device as defined in claim 1, wherein the outer perimeter of the gasket and the interior surface of the housing forming the microphone compartment are non-cylindrical configurations which seat against each other to secure a fixed position for the gasket within the microphone compartment without need for adhesive material.

6. A device as defined in claim 5, wherein the noncylindrical configuration of the interior surface of the housing is generally concave and the outer perimeter of the gasket has a generally convex configuration, enabling the gasket to nest in the concave configuration of the housing.

7. A device as defined in claim 6, wherein the noncylindrical configurations of the outer perimeter of the gasket and interior surface of the housing each comprise a central portion which is cylindrical and includes first and second opposing ends, and first and second conical portions which respectively have larger diameters at one edge which form junctures with the first and second opposing ends of the cylindrical central portion and smaller diameters at a remaining edge such that said conical portions extend outwardly from the central cylindrical section in opposing directions so as to taper inwardly from their respective junctions toward a central axis of the central cylindrical portion whereby said remaining edge is positioned inwardly away from the plane of the cylindrical central portion to form the respective concave and convex configurations.

8. A device as defined in claim 6, further including an annular cavity centrally disposed around the outer perimeter of the gasket and between the gasket and the housing to form an insulative cavity ring which divides contact of the gasket with the housing to upper and lower sections.

9. A device as defined in claim 1, wherein the inner perimeter of the gasket includes an annular cavity centrally disposed around the inner perimeter of the gasket and between the gasket and the microphone case to form an insulative cavity ring which divides contact of the gasket with the case to upper and lower sections which are respectively equidistant from the plane which includes the active microphone element.

10. A device as defined in claim 9, wherein the upper and lower sections of the inner perimeter of the gasket are respectfully in circumferentially continuous contact around the microphone case.

11. A device as defined in claim 1, further comprising a speaker element positioned at an end of the housing adjacent the ear canal, said microphone element being positioned at the remaining end of the housing.

12. A device as defined in claim 11, further comprising telephone control circuitry coupled to the speaker element and microphone element, said telephone control circuitry providing access for the speaker element and microphone element as part of a telephone system which provides hands-free use based on both speaking and listening functions being provided through the user's ear.

13. A device as defined in claim 11, further comprising a radio frequency transmitter/receiver unit coupled to the microphone element and speaker element respectively, thereby enabling the use of the ear piece device as part of a wireless system of communication.

14. A device as defined in claim 11, further comprising associated communication and transfer circuitry tuned to a common frequency with the transmitter/receiver unit, thereby enabling use of the ear piece device as part of a microcell communication system, said ear piece device providing direct communication into respective microcell communications satellite receiving and transmitting stations.

15. A device as defined in claim 11, further including connecting means for coupling the microphone element to a modem associated with a computer, said connecting means enabling direct audio transmission into the modem without outside audio signal other than the voice of the user.

16. A device as defined in claim 11, further comprising a sizing ring coupled to the housing, the sizing ring modifies the diameter of the housing which is snugly fit at the ear canal.

17. An ear piece device for use in a communication system, said device comprising:
a housing having a speaker end and a microphone end, said speaker end being configured for a snug fit at the ear canal of a user, said speaker end and microphone end being divided by an acoustically insulating wall which encloses the microphone end within the housing to form a microphone compartment defined by an interior surface of the housing;
a microphone positioned within the microphone compartment and comprising a rigid case having an exterior surface and an active microphone element contained within the rigid case;
a speaker element mounted with sound projection oriented toward the user's ear canal and including isolation means coupled between the speaker element and the housing for selectively isolating undesirable frequencies that interfere with sensitivity of audio pick up at the microphone end of the housing;
said microphone compartment including at least two openings in the housing forming sound transmission ports operable to pass ambient sound waves to the microphone element, said openings being respectively positioned at opposite sides of the microphone element for enabling cancellation of acoustical waves representing distant background sound which enters the compartment through air transmission from a substantial distance as compared to the near location of the user's skull;
a support gasket relatively adjustable with respect to and positioned around the rigid case so as to form a bridge between said rigid case and the housing, said gasket having an outer perimeter in contact with the interior surface of the housing and an inner perimeter which defines two separate circumferential points of contact at the rigid case such that said support gasket is contactably sandwiched between the interior surface of the housing and the exterior surface of the rigid case at the two circumferential points of contact, wherein said two circumferential points of contact are respectively common to first and second substantially parallel planes passing through the rigid case and being substantially equidistant from and on opposing sides of a plane which includes the active microphone element, to thereby cause mechanical waves in the housing to pass from the housing through the support gasket and into the rigid case at the two opposing circumferential points of contact such that said mechanical waves arrive at the active microphone element at substantially the same time and in opposing phase relationship to cause substantially all of said mechanical waves to cancel each other; and means for coupling signal output from the microphone element to an audio circuit for processing.

18. A device as defined in claim 17, wherein the support gasket is formed of a Kreton (tm) polymer composition.

19. A device as defined in claim 17, wherein the outer perimeter of the gasket and the interior surface of the housing forming the microphone compartment are non-cylindrical configurations which seat against each other to secure a fixed position for the gasket within the microphone compartment without need for adhesive material.

20. A device as defined in claim 19, wherein the non-cylindrical configuration of the interior surface of the housing is generally concave and the outer perimeter of the gasket has a generally convex configuration, enabling the gasket to nest in the concave configuration of the housing.

21. A device as defined in claim 20, wherein the non-cylindrical configurations of the outer perimeter of the gasket and the interior surface of the housing each comprise a central portion which is cylindrical and includes first and second opposing ends, and first and second conical portions which respectively have larger diameters at one edge which form junctures with the first and second opposing ends of the cylindrical central portion and smaller diameters at a remaining edge such that said conical portions extend outwardly from the central cylindrical section in opposing directions so as to taper inwardly from their respective junctions toward a central axis of the central cylindrical portion whereby said remaining edge is positioned inwardly away from the plane of the cylindrical central portion to form the respective concave and convex configurations.

22. A device as defined in claim 20, further including an annular cavity centrally disposed around the outer perimeter of the gasket and between the gasket and the housing to form an insulative cavity ring which divides contact of the gasket with the housing to upper and lower sections.

23. A device as defined in claim 17, wherein the inner perimeter of the gasket includes an annular cavity centrally disposed around the inner perimeter of the gasket and between the gasket and the rigid case to form an insulative cavity ring which divides contact of the gasket with the rigid case to upper and lower sections which are respectively equidistant from the plane which includes the active microphone element.

24. A device as defined in claim 23, wherein the upper and lower sections of the inner perimeter of the gasket are respectfully in circumferentially continuous contact around the rigid case.

25. A method for isolating desired air born vibrations to be detected by a small microphone from background vibrations within a housing which contains the small microphone, said method comprising the steps of:
a) positioning a microphone case containing an active microphone element within a microphone compartment formed within the housing and defined by an interior surface of the housing;
b) forming at least two openings in the housing as sound transmission ports operable to pass ambient sound waves to the microphone element, said openings being respectively positioned at opposite sides of the microphone element for enabling cancellation of acoustical waves representing distant background sound which enters the compartment through air transmission from a substantial distance as compared to the near location of the user's skull;

c) positioning the microphone case and active microphone element within a support gasket which forms a bridge between the housing and the microphone case and contained active microphone element such that said support gasket is relatively adjustable with respect to said microphone case, said gasket having an outer perimeter in contact with the interior surface of the housing and an inner perimeter which defines two separate circumferential points of contact at the microphone case such that said support gasket is contactably sandwiched between the interior surface of the housing and the exterior surface of the rigid case at the two circumferential points of contact, wherein said two circumferential points of contact are respectively common to first and second substantially parallel planes passing through the rigid case and being substantially equidistant from and on opposing sides of a plane which includes the active microphone element, to thereby cause mechanical waves in the housing to pass from the housing through the support gasket and into the rigid case at the two opposing circumferential points of contact such that said mechanical waves arrive at the active microphone element at substantially the same time and in opposing phase relationship to cause substantially all of said mechanical waves to cancel each other; and d) coupling signal output from the microphone element to an audio circuit for processing.

* * * * *